United States Patent
Caballero-McCann et al.

(10) Patent No.: US 7,916,855 B2
(45) Date of Patent: Mar. 29, 2011

(54) SYSTEM AND METHOD FOR STORING AND RESTORING COMMUNICATION DIALOG

(75) Inventors: Denise G. Caballero-McCann, Raleigh, NC (US); Sameer M. Azad, Morrisville, NC (US); Kai Wang, Cary, NC (US); Yi Zhang, Mountain View, CA (US); Juhee Garg, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1401 days.

(21) Appl. No.: 11/031,162

(22) Filed: Jan. 7, 2005

(65) Prior Publication Data
US 2006/0153064 A1 Jul. 13, 2006

(51) Int. Cl.
*H04M 7/00* (2006.01)

(52) U.S. Cl. ............ 379/221.04; 379/93.21; 379/202.01; 379/205.01; 455/519

(58) Field of Classification Search .................. 370/352, 370/216–220; 455/519, 518, 507, 416; 709/224; 715/706; 379/202.01, 9.05, 93.21, 112.02, 379/158, 205.01, 221.03, 221.04
See application file for complete search history.

(56) References Cited

U.S. PATENT DOCUMENTS

| | | | |
|---|---|---|---|
| 4,456,788 A | 6/1984 | Kline et al. | 179/7.1 R |
| 5,544,303 A | 8/1996 | Maroteaux et al. | 395/161 |
| 5,828,652 A | 10/1998 | Bales et al. | 370/225 |
| 6,163,692 A | 12/2000 | Chakrabarti et al. | 455/416 |
| 6,430,150 B1 | 8/2002 | Azuma et al. | 370/218 |
| 6,498,791 B2 | 12/2002 | Pickett et al. | 370/353 |
| 6,757,357 B1 | 6/2004 | Finch et al. | 379/9.03 |
| 6,788,933 B2 | 9/2004 | Boehmke et al. | 455/423 |
| 2002/0005865 A1* | 1/2002 | Hayes-Roth | 715/706 |
| 2004/0193725 A1* | 9/2004 | Costa-Requena et al. | 709/238 |
| 2004/0203677 A1* | 10/2004 | Brown et al. | 455/416 |

* cited by examiner

*Primary Examiner* — Md S Elahee
(74) *Attorney, Agent, or Firm* — Baker Botts L.L.P.

(57) ABSTRACT

Storing and restoring a communication session includes establishing a communication session by exchanging dialog. Dialog from the communication session is stored to a persistent storage. Endpoints participate in the communication session to assert functionality to a monitoring module. If a failure occurs during the communication session, an endpoint receives the stored dialog from the persistent storage. Furthermore, the endpoint restores the received dialog onto a protocol stack to continue the communication session without loss of dialog.

20 Claims, 3 Drawing Sheets

SYSTEM AND METHOD FOR STORING AND RESTORING COMMUNICATION DIALOG

TECHNICAL FIELD

This invention relates generally to the field of communications and more specifically to a system and method for storing and restoring communication dialog.

BACKGROUND

Historically, telecommunications have involved the transmission of signals over a network dedicated to telecommunications. Similarly, data communications between computers have also historically been transmitted on a dedicated data network. Currently, telecommunications and data transmissions are being merged into an integrated communication network using technologies such as Voice over Packet (VoP). Since many networks transmit computer data using packet protocols, such as the Internet Protocol (IP), VoP uses this existing technology to transmit signals by converting these signals into digital data and encapsulating the data for transmission over a packet-based network. While transmitting data over the network, failure by any component may cause a loss of data and interrupt the communication.

SUMMARY OF THE DISCLOSURE

In accordance with the present invention, a system and method for call processing applications is provided that substantially eliminates or greatly reduces disadvantages and problems associated with previously developed systems and methods. In particular, the present invention contemplates a system and method for storing and restoring communication dialog in a communication session.

According to one embodiment of the present invention, storing and restoring a communication session includes establishing a communication session by exchanging dialog. Dialog from the communication session is stored to a persistent storage. Endpoints participate in the communication session to assert functionality to a monitoring module. If a failure occurs during the communication session, an endpoint receives the stored dialog from the persistent storage. Furthermore, the endpoint restores the received dialog onto a protocol stack to continue the communication session without loss of dialog.

Certain embodiments of the invention may provide one or more technical advantages. A technical advantage of one embodiment may be that the session may be restored in the event of an endpoint failure without losing any dialog information. Another technical advantage of one embodiment may be that the communication session between endpoints may be restored without end users and endpoints noticing the failure.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, like numerals being used for like and corresponding parts of the various drawings, in which.

DETAILED DESCRIPTION OF THE DRAWINGS

Figure 1:
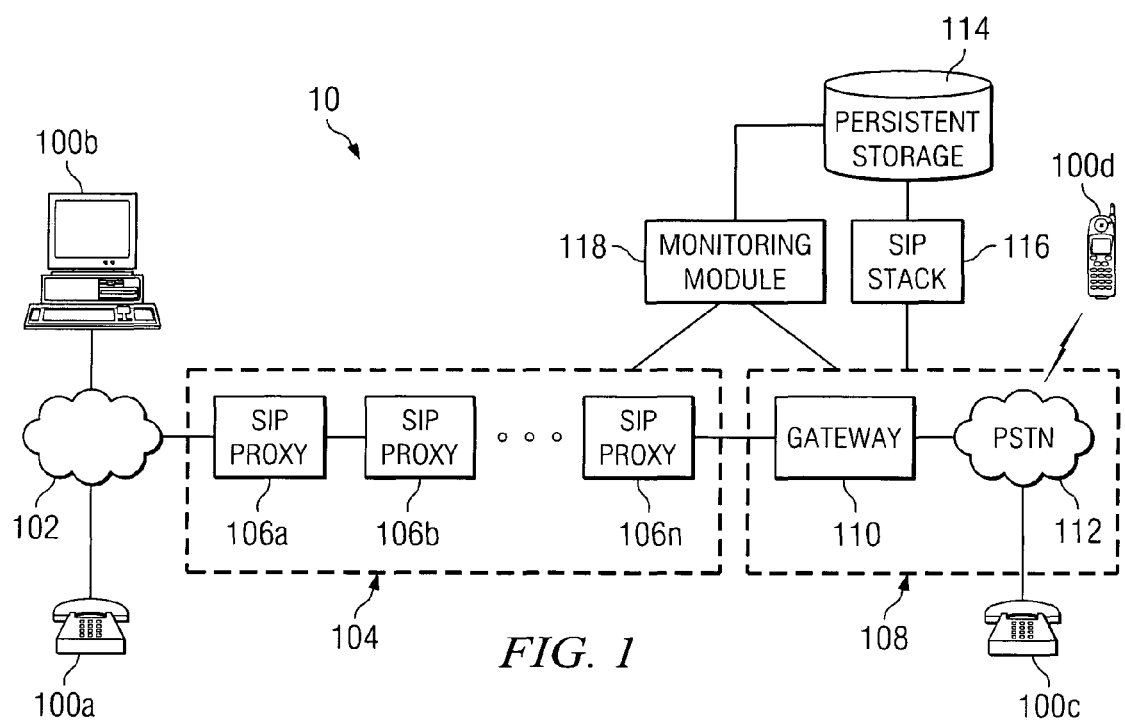
FIG. 1 is a block diagram illustrating one embodiment of a system capable of recovering from endpoint failure in a communication session.

FIG. 1 is a block diagram of one embodiment of a system 10 capable of recovering from a failure in a communication session. In general, system 10 includes endpoints 100a, 100b, 100c, 100d (referred to collectively as endpoints 100), proxies 106, and a persistent storage 114 capable of a seamless failure recovery. System 10 may use any suitable protocol, such as session initiation protocol (SIP) or H.323, to communicate between one or more endpoints 100.

Endpoints 100 may be any combination of hardware and/or software that provide communication services to a user. Endpoints 100 may include analog, digital, or Internet protocol (IP) telephones, cell phones, personal computers, video-conferencing equipment, wireless communication devices, servers, conference servers, or any other suitable device. Although system 10 illustrates a particular number of endpoints 100, system 10 contemplates any number and arrangement of endpoints 100.

Endpoints 100 exchange audio, voice, data or other information (generally referred to as dialog) in a communication session in system 10 via network 102. The term "communication session" refers to any connection between endpoints 100 that allows the exchange of dialog. One of endpoints 100 may fail during a communication session, or communication between endpoints 100 may fail, because of software errors, memory overloads, power failures, or any number of other conditions that prevent endpoints 100 from communicating. System 10 preserves the dialog from a communication session without interruption if failure occurs.

Network 102 represents any suitable combination or arrangement of components supporting communications between endpoints 100 and proxy network 104. For example, network 102 may include one or more local area networks (LANs); one or more wide area networks (WANs); a global distributed network, such as the Internet, Intranet, or Extranet; any other form of a wireless or wireline communication network; components of other suitable communications networks; or any combination of the preceding. Generally, network 102 provides for the communication of packets, cells, frames, or other portions of information (generally referred to as packets) between endpoints 100. Network 102 may include any combination of gateways, routers, hubs, switches, and any other hardware and/or software.

Proxy network 104 includes one or more SIP proxies 106a, 106b (referred to collectively as SIP proxies 106). SIP proxies 106 participate in the transfer of communication dialog between endpoints 100. SIP proxies 106 may refer to a logical entity that transmits messages. SIP proxy 106 may handle any suitable number of messages at any suitable rate. Proxy network 104 may couple to non-packet-based networks, such as telephone network 108. Although proxy network 104 couples to telephone network 108, system 10 contemplates any number of possible configurations extending from proxy network 104. For example, proxy network 104 may be coupled directly to suitable endpoints 100.

Telephone network 108 includes gateway 110 and PSTN 112. Gateway 110 allows endpoints 100 to establish a dialog between a packet-based network and a non-packet based network, such as PSTN 112. Gateway 110 may handle signaling, which notifies endpoints 100 of a communication session, or signaling and media, which has notification capabilities and exchanges information; such as audio, video, or data; between endpoints 100.

Persistent storage 114 stores the communication dialog as the dialog is transferred between endpoints 100. Persistent storage 114 provides the communication dialog to endpoints 100 if a failure occurs. Persistent storage 114 may be any suitable memory that stores and facilitates the retrieval of dialog. Persistent storage 114 may include a database, a Javaspace, or any text file.

SIP stack 116 represents a data structure used in session initiation protocol. SIP stack 116 stores the dialog from the communication session. SIP stack 116 may be a Java SIP stack. The architecture of SIP stack 116 may include the following layers: a transport layer, a transaction layer, a dialog layer, and an offer-answer layer. Additional layers may be added to SIP stack 116. Monitoring module 118 monitors the communication session to determine if failure occurs in endpoint 100. Upon detecting a failure, monitoring module 118 initiates the restoration process. In the illustrated embodiment, monitoring module 118 connects to persistent storage 114, telephone network 108, and proxy network 104; but monitoring module 118 may connect to any suitable element in system 10.

In operation, endpoints 100 establish a communication session with endpoints 100. During the communication session, initiating endpoints 100*a-b* establish dialog over network 102 through SIP proxies 106 to endpoints 100*c-d*. The session may be established using SIP, H.323, or any suitable protocol. For example, if using SIP, endpoints 100*a-b* send an invite message via network 102 to SIP proxies 106. SIP proxies 106 transfer the invite message to telephone network 108. Gateway 110 translates the invite message into a non-packet based format. The message proceeds to PSTN 112 and endpoints 100*c-d* receive notification of the call. The notification may come in the form of a ring from PSTN 112.

According to another embodiment of the invention, SIP proxies 106 may transfer the invite message to a packet based network. Endpoints 100 send an invite message via network 102 to SIP proxies 106. SIP proxies 106 transfer the invite message to packet based endpoints 100. Packet based endpoints 100 may respond with an OK message to initiating endpoints 100 if available for the communication session. Upon endpoints 100 receiving the OK message, the communication session begins between endpoints 100 via network 102 and SIP proxies 106.

As system 10 establishes the communication session, gateway 110 or endpoint 100 may store the dialog to persistent storage 114 using an application programming interface (API) in stack 116. The back up may occur at any specified time to capture the necessary dialog to restore the communication session in the event of a failure. When the API backs up the dialog to persistent storage 114, the API may select which persistent storage 114 to store the dialog. For instance, persistent storage 114 may be a database, a Javaspace, or a text file. The API may store the backed up dialog in any suitable format.

Storing the dialog includes serializing the dialog in persistent storage 114. When serializing the dialog, the API may selectively choose which field of the dialog to serialize in persistent storage 114. The chosen fields may include those fields necessary to restore the dialog in the event of a failure. The API may serialize the fields in any manner to store the dialog quickly. For example, when system 10 establishes a dialog between user agent client (UAC) and user agent server (UAS), the API may serialize the UAC and the UAS as boolean values rather than storing the entire data field. Serializing the dialog in this manner enhances the normally slow process of backing up to persistent storage 114.

If monitoring module 118 detects a failure in an element of system 10, monitoring module 118 may inform another element, a restored element, to continue the communication session. Monitoring module 118 may also begin a new instance of the failed element that takes over the communication session. The APIs begin deserializing the dialog from persistent storage 114 and inserting the dialog onto SIP stack 116. Inserting the dialog onto SIP stack 116 restores the dialog from the failure without interruption in the communication session. For example, if gateway 110 fails, monitoring module 118 starts a new instance of gateway 110. The new instance of gateway 110 starts to retrieve dialogs stored in persistent storage 114 and inserts the dialogs onto SIP stack 116. Because the dialog was custom serialized in persistent storage 114, the restoration process occurs faster. If an in-dialog request comes before the dialog is restored into the new instance of gateway 110, the specifically distinguished dialog may be restored quickly on-demand. At this time, the restoration of other dialogs is held to the priority of the on-demand restoration. The communication session between endpoints 100 continues without loss of dialog and without endpoints 100 noticing the failure of the element in the communication session.

An element of system 10 may include any suitable configuration of an interface, logic, and memory for performing the operations of the element. An interface refers to any suitable structure of a device operable to receive input for the device, send output from the device, or both, and may comprise one or more ports. Logic refers to any suitable hardware, software, or combination of hardware and software. For example, logic may comprise a processor. A processor may refer to any suitable device operable to execute instructions and manipulate data to perform operations. Memory refers to any structure operable to store and facilitate retrieval of information used by a processor, and may comprise Random Access Memory (RAM), Read Only Memory (ROM), magnetic drives, disk drives, Compact Disk (CD) Drives, Digital Video Disk (DVD) drives, removable dialog storage, any other suitable data storage device, or a combination of any of the preceding.

Modifications, additions, or omissions may be made to system 10 without departing from the scope of the invention. For example, telephone network 108 may be omitted and replaced by a packet based network. The components of system 10 may be integrated or separated according to particular needs.

Moreover, the operations of system 10 may be performed by more, fewer, or other modules. For example, the operations of SIP proxies 106 and the API may be performed by one SIP proxy 106. Additionally, operations of system 10 may be performed using any suitable logic comprising software, hardware, other logic, or any suitable combination of the preceding.

Figure 2:
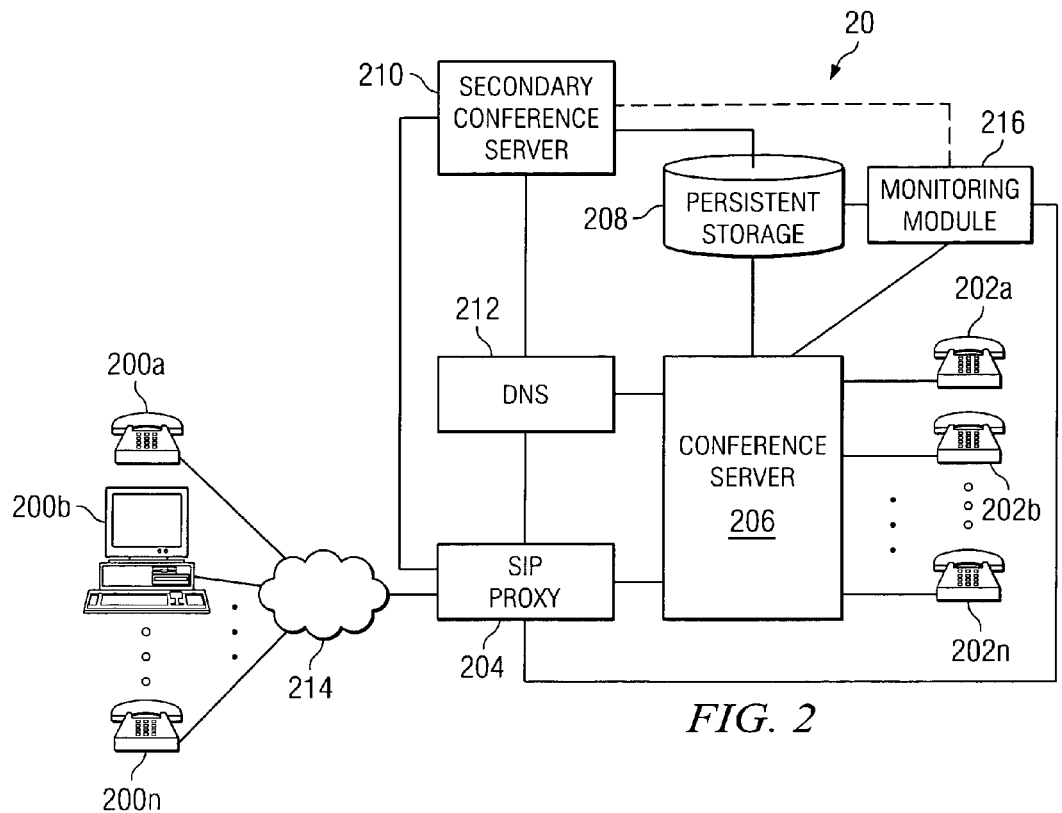
FIG. 2 is a block diagram illustrating one embodiment of a system capable of recovering from endpoint failure using a domain name server.

FIG. 2 is a block diagram of one embodiment of a system 20 capable of restoring dialog between endpoints 200*a*, 200*b* (referred to collectively as endpoints 200) and endpoints 202*a*, 202*b* (referred to collectively as endpoints 202) that have failed in a communication session. In general, system 20 includes a conference server 206, a persistent storage 208, and a secondary conference server 210 that stores and restores dialog when a failure occurs in a communication session. In the illustrated embodiment, system 20 uses SIP to communicate between endpoints 200 and endpoints 202.

Endpoints 200 and endpoints 202 exchange audio, video, data, or other information using network 214. Endpoints 200 and endpoints 202 are substantially equivalent to endpoints 100 of FIG. 1. Additionally, network 214 is substantially equivalent to network 102 of FIG. 1. SIP proxy 204 connects to network 214.

SIP proxy 204 is substantially equivalent to SIP proxies 106 of FIG. 1. Additionally, SIP proxy 204 supports an Address of record (AoR) of a user. An AoR is a uniform resource identifier (URI) that points to a domain with a location service that can map the URI to another URI where a specific user may be available. In general, an AoR is a "public address" of the user. By supporting AoR, the SIP endpoints 200, 202 use a URI in a request instead of an IP address to locate a remote user. SIP proxy 204 resolves the URI into the actual IP address when handling the request. SIP proxy 204 also inserts a record-route header to SIP messages. Inserting the header ensures that future message exchanges do not skip SIP proxy 204 and remain in the path of subsequent SIP requests for the same call leg. SIP proxy 204 connects to conference server 206 and Domain Name Server (DNS) 212.

Conference server 206 may include any suitable combination or arrangement of logic operating to support a communication session between endpoints 200 and endpoints 202. Conference server 206 may facilitate the communication session by managing the arrival and departure of endpoints 200 and/or endpoints 202 in a conference session. Conference server 206 may also provide several other conference management features, such as routing data, audio, and video or providing for cross dialog participation. For example, conference server 206 may provide a centralized repository of web pages for use by endpoints 200 and 202. Conference server 206 may communicate the web pages to endpoints 200 and 202 in response to web page requests. Conference server 206 may reside within endpoints 200 and/or endpoints 202 or in system 10 as a separate element.

Persistent storage 208 connects to conference server 206 and secondary conference server 210. Persistent storage 208 is substantially equivalent to persistent storage 114 of FIG. 1.

Secondary conference server 210 may include any suitable combination or arrangement of logic operating to support a communication session provided by endpoints 200 and endpoints 202. Secondary conference server 210 is substantially equivalent to conference server 206 as described above. Secondary conference server 210 may connect to SIP proxy 204 and DNS 212.

DNS 212 may include any suitable combination or arrangement of logic operating to translate domain names into IP addresses. DNS 212 may locate IP addresses that correspond to a communication session.

In operation, endpoints 200 attempt to establish a conference session with endpoints 202. During the session, endpoints 200 establish a dialog over network 214 and SIP proxy 204 with conference server 206. Endpoints 202 may join the session by dialing into conference server 206. Upon endpoints 202 dialing into conference server 206, endpoints 200 and endpoints 202 participate in a conference session. During the conference session, a dialog, which includes media, is established between endpoints 200 and endpoints 202. Conference server 206 backs up the dialog to persistent storage 208 using an API. The back up may occur at any specified time to capture the necessary dialog to restore the communication session in the event of a failure.

Serializing the dialog in persistent storage 208 occurs in substantially the equivalent manner as described with respect to FIG. 1. Serializing the dialog in a custom manner enhances the normally slow process of backing up to persistent storage 208.

During the communication session, monitoring module 216 monitors the session for a failure between endpoints 200 and endpoints 202. A failure may occur if conference server 206 crashes. If a failure is detected, SIP proxy 204 queries DNS 212 to determine a location from which to continue the conference service. If conference server 206 crashes, secondary conference server 210 informs DNS 212 of its availability to handle the conference session. DNS 212 provides SIP proxy 204 with the IP address of secondary conference server 210. Upon receiving the IP address of secondary conference server 210, SIP proxy 204 contacts secondary conference server 210 for conference services. Secondary conference server 210 restores the conference session on SIP proxy 204 and the session continues without noticeable interruption by endpoints 200 and 202 and without loss of dialog.

While SIP proxy 204 finds a server to handle the conference session, secondary conference server 210 may restore the backed up dialog from persistent storage 208. Secondary conference server 210 restores the dialog upon informing DNS 212 of its availability to take over the conference session. During the restoration, APIs insert the dialog into secondary conference server 210. Secondary conference server 210 restores the dialog from the failed conference session while SIP proxy 204 is getting information about available conference servers. When SIP proxy 204 determines that secondary conference server 210 is available and redirects the conference session requests to secondary conference server 210, secondary conference server 210 may restore the dialog from the conference session. Endpoints 200 and 202 do not notice that conference server 206 has failed and that secondary conference server 210 manages the conference session. Additionally, dialog from the conference session is not lost when system 20 redirects the conference services to secondary conference server 210.

In another embodiment of this invention, secondary conference server 210 may begin a new conference session rather than continuing the conference session that failed and restoring the dialog from persistent storage 208. Secondary conference server 210 may manage the dialog transmission of a new conference session. Additionally, secondary conference server 210 may handle new requests within a previous conference dialog that have not been restored to secondary conference server 210. For example, once SIP proxy 204 establishes conference services with secondary conference server 210, endpoints 202 may transmit a new request. Secondary conference server 210 delays the restoration of the backed up dialog to handle the new request from endpoints 202. Secondary conference server 210 searches persistent storage 208 for any dialog that may correspond to the new request transmitted. If secondary conference server 210 finds corresponding dialog to the new request, secondary conference server 210 restores that dialog. Then the request is processed normally. If secondary conference server 210 does not find corresponding dialog to the new request, an error response is generated and sent to endpoints 202. Secondary conference server 210 continues to restore the backed up dialog from persistent storage 208 after handling the new request.

Modifications, additions, or omissions may be made to system 20 without departing from the scope of the invention. The components of system 20 may be integrated or separated according to particular needs. Moreover, the operations of system 20 may be performed using any suitable logic comprising software, hardware, other logic, or any suitable combination of the preceding.

Figure 3:
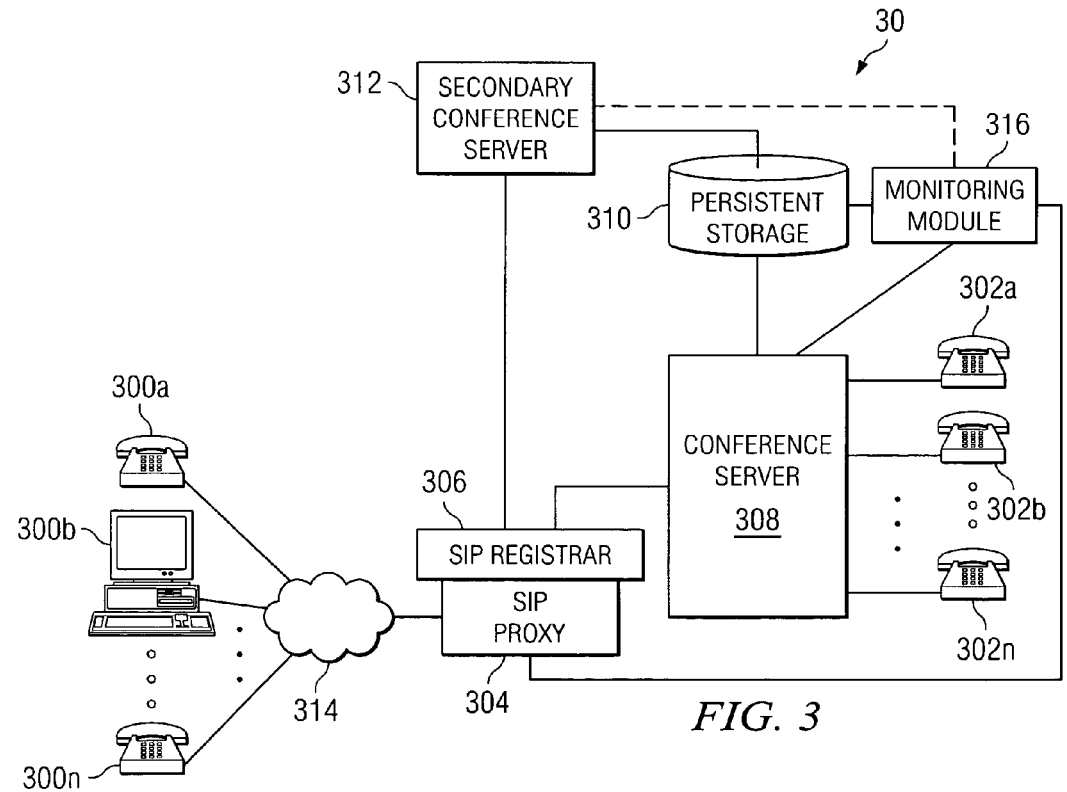
FIG. 3 is a block diagram illustrating one embodiment of a system capable of recovering from endpoint failure using a session initiation protocol registrar.

FIG. 3 is a block diagram of one embodiment of a system 30 capable of restoring dialog between endpoints 300a, 300b (referred to collectively as endpoints 300) and endpoints 302a, 302b (referred to collectively as endpoints 302). In general, system 30 includes a conference server 308, a persistent storage 310, and a secondary conference server 312 that store and restore dialog when a failure occurs in a communication session. In the illustrated embodiment, system 30 uses SIP to communicate between endpoints 300 and endpoints 302.

Endpoints 300 and 302 exchange audio, video, data, or other information using network 314. Endpoints 300 and endpoints 302 are substantially equivalent to endpoints 100 of FIG. 1. Furthermore, network 314 is substantially equivalent to network 102 of FIG. 1. Network 314 connects to SIP proxy 304. SIP proxy 304 is substantially equivalent to SIP proxy 204 of FIG. 2. SIP proxy 304 connects to SIP registrar 306.

SIP registrar 306 may include any combination or arrangement of logic operating to register elements in system 30. For example, conference server 308 and secondary conference server 312 register their addresses with SIP registrar 306. Conference server 308 registers at SIP registrar 306 with an address of record. When monitoring module 316 detects that conference server 308 is not responding, monitoring module 316 informs secondary conference server 312 to register at SIP Registrar 306, using the same address of record that conference server 308 initially used at registration. Conference server 308 is substantially equivalent to conference server 206 of FIG. 2.

Persistent storage 310 connects to conference server 308 and secondary conference server 312. Persistent storage 310 is substantially equivalent to persistent storage 208 of FIG. 2. Secondary conference server 312 is substantially equivalent to secondary conference server 210 of FIG. 2.

In operation, endpoints 300 attempt to establish a conference session with endpoints 302. Establishing the conference session and backing up the dialog to persistent storage 310 occurs in the substantially equivalent manner as described with respect to FIG. 2.

Serializing the dialog in persistent storage 310 occurs in the substantially equivalent manner as described with respect to FIG. 1. Serializing the dialog in a custom manner enhances the normally slow process of backing up to and restoring from persistent storage 310.

During the communication session, monitoring module 316 monitors the session to detect a failure in the conference session. A failure may occur if conference server 308 crashes. If a failure occurs, SIP proxy 304 queries SIP registrar 306 to determine the location of the conference service. If conference server 308 crashes, SIP registrar 306 may provide SIP proxy 304 with the IP address of an available server. In the illustrated embodiments, SIP registrar provides SIP proxy 304 with the IP address of secondary conference server 312. Upon receiving the IP address of secondary conference server 312, SIP proxy 304 directs the conference session requests from crashed conference server 308 to secondary conference server 312.

Restoring the dialog to secondary conference server 312 occurs in a substantially equivalent manner as described in FIG. 2.

In another embodiment of this invention, secondary conference server 312 may begin a new conference session rather than continuing the conference session that crashed. Additionally, secondary conference server 312 handles new requests within a previous conference session. Establishing a new conference session and handling new requests within a previous conference session occur in a substantially equivalent manner as described in FIG. 2.

Modifications, additions, or omissions may be made to system 30 without departing from the scope of the invention. The components of system 30 may be integrated or separated according to particular needs. Moreover, the operations of system 30 may be performed using any suitable logic comprising software, hardware, other logic, or any suitable combination of the preceding.

Figure 4A:
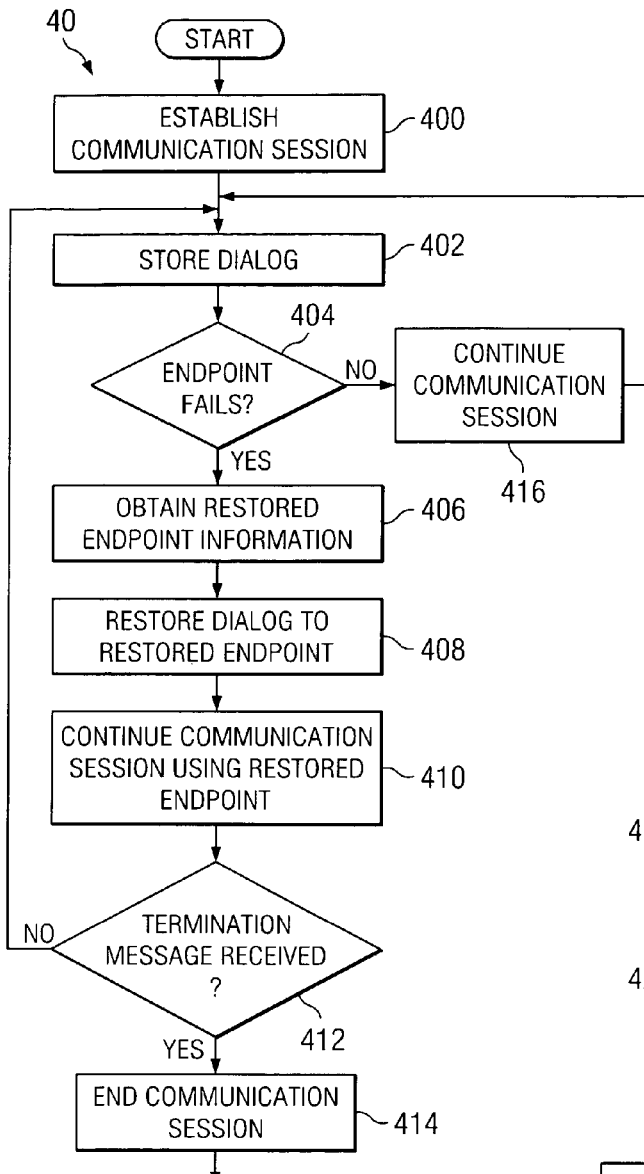
FIG. 4A is a flowchart of one embodiment of a method for storing and restoring a communication session.

FIG. 4A is a flowchart 40 of one embodiment of a method for storing the dialog of a communication session and restoring that dialog if a failure occurs during the session. System 20 establishes a communication session between endpoints 200 and 202 at step 400. At step 402, system 20 stores the dialog established between endpoints 200 and 202. System 20 determines whether the communication session has failed at step 404 by monitoring the communication session. If monitoring module 216 does not detect a failure in the communication session at step 404, system 20 continues the communication session at step 416 and stores dialog from the session at step 402. If a failure occurs in the communication session at step 404, system 20 obtains restored endpoint information at step 406. System 20 restores the dialog to the restored endpoint at step 408. At step 410, system 20 continues the communication session using the restored endpoint with the existing dialog.

As the communication session proceeds, system 20 monitors whether it has received a termination message in step 412. If system 20 receives a termination message, it ends the communication session at step 414 and clears the dialog from persistent storage. If system 20 does not receive a termination message, the communication session proceeds from step 402.

Figure 4B:
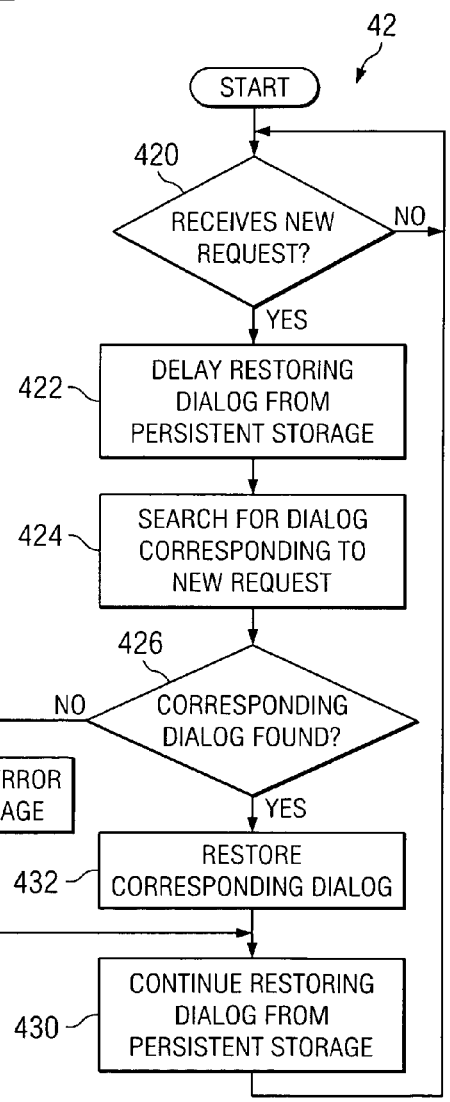
FIG. 4B is a flowchart of one embodiment of a method for managing a new communication request.

FIG. 4B is a flowchart 42 of one embodiment of a method for managing new communication requests during a failover period when a backup entity is restoring the dialogs. The method of managing new communication requests occurs concurrently with the method for storing and restoring communication dialog as depicted in flowchart 40 of FIG. 4A. As the communication session proceeds, system 20 determines if it receives a new request in step 420. If system 20 does not receive a new request, system 20 continues monitoring for new requests. If system 20 receives a new request, system 20 delays restoring the dialog from the persistent storage at step 422 to handle the new request. System 20 searches for dialog that corresponds to the new request at step 424. If system 20 does not find corresponding dialog at step 426, system 20 sends an error message in step 428. Upon sending the error message, system 20 continues restoring the dialog from the persistent storage at step 430 and proceeds with the method at step 420. If system 20 finds corresponding dialog at step 426, system 20 restores the corresponding dialog to the restored endpoint at step 432 and handles the incoming request as if there has not been a failure. System 20 continues restoring the dialog from the restored communication session in step 430; the method then continues from step 420.

The methods described are only examples of storing the dialog from a communication session, restoring the dialog from a failure in the communication session, and managing a new request in a communication session. Modifications, additions, or omissions may be made to the methods without departing from the scope of the invention. The methods may include more, fewer, or other steps. Additionally, steps may be performed in any suitable order without departing from the scope of the invention.

Certain embodiments of the invention may provide one or more technical advantages. A technical advantage of one embodiment may include that a persistent storage stores dialog from a communication session and the dialog may be restored if the session fails without the endpoints realizing the failure occurred. Another technical advantage of one embodiment may include custom serializing the dialog when storing it into the persistent storage expedites the storing and restoring processes.

While this disclosure has been described in terms of certain embodiments and generally associated methods, alterations and permutations of the embodiment and methods will be apparent to those skilled in the art. Accordingly, the above description of example embodiments does not constrain this disclosure. Other changes, substitutions, and alterations are also possible without departing from the spirit and scope of this disclosure.

What is claimed is:

1. A system for storing and restoring a communication session, comprising:
    a plurality of endpoints operable to establish the communication session with a primary server;
    a proxy operable to establish dialog between the plurality of endpoints during the communication session;
    a monitoring module operable to monitor the communication session to detect a failure and determine whether the failure is of the primary server;
    a persistent storage coupled to the monitoring module and operable to store the dialog; and
    an application programming interface operable to:
        serialize one or more selected fields of the dialog in the persistent storage; and
        if the failure is detected:
            restore the dialog to a restored endpoint by restoring the dialog on a protocol stack without loss of dialog from the communication session, without interrupting the dialog of the communication session for the at least one failed endpoint participating in the communication session, and without communicating a notification to the plurality of endpoints when the failure is detected, wherein the dialog is restored to a secondary server if the failure is of the primary server; and
            determine whether a new request is received and if the new request is received, delay the restoration of the dialog from the persistent storage and search for corresponding dialog to the new request.

2. The system of claim 1, further comprising:
    a domain name server (DNS) coupled to the proxy and the plurality of endpoints, the DNS operable to: store endpoint information, the DNS operable to respond to a request with information of a restored endpoint; and
    wherein the proxy is operable to query the DNS if at least one endpoint fails and contact the restored endpoint for communication services.

3. The system of claim 1, further comprising:
    a session initiation protocol (SIP) registrar coupled to the proxy and the plurality of endpoints, the SIP registrar operable to: receive registration information from the endpoint, the SIP registrar operable to respond to a request with information of a restored endpoint; and
    wherein the proxy is operable to query the SIP registrar if at least one endpoint fails and contact the restored endpoint for communication services.

4. The system of claim 1, wherein the restored endpoint is operable to associate with new dialog the persistent storage does not store.

5. The system of claim 4, wherein the persistent storage is operable to: delay restoring dialog to the restored endpoint, the persistent storage operable to search for corresponding dialog to a new request the restored endpoint receives.

6. The system of claim 5, wherein the restored endpoint is operable to restore the dialog if the persistent storage contains the corresponding dialog to the new request, the restored endpoint is operable to generate an error response if the persistent storage does not contain the corresponding dialog to the new request.

7. A method for storing and restoring a communication session, comprising:
    facilitating establishment of a communication session with a primary server by facilitating an exchange of dialog;
    facilitating storage of the dialog from the communication session to a persistent storage;
    facilitating monitoring of the communication session by a monitoring module;
    serializing one or more selected fields of the dialog in the persistent storage, wherein an application programming interface selectively chooses the field to serialize in the persistent storage;
    determining whether a failure occurs during the communication session and determining whether the failure is of the primary server;
    if the failure occurs during the communication session:
        determining whether a new request is received and if the new request is received, delaying restoration of the dialog from the persistent storage and searching for corresponding dialog to the new request;
        receiving the corresponding dialog from the persistent storage; and
        restoring the corresponding dialog onto a protocol stack to continue the communication session without loss of dialog and without interrupting the dialog of the communication session for the at least one failed endpoint participating in the communication session and without communicating a notification to the plurality of endpoints when the failure occurs, wherein the corresponding dialog is restored to a secondary server if the failure is of the primary server.

8. The method of claim 7, further comprising:
    sending domain name information to a domain name server;
    receiving a response from the domain name server regarding a restored endpoint if at least one of a plurality of endpoints fails;
    querying the restored endpoint to continue the communication session.

9. The method of claim 7, further comprising:
    registering information with a session initiation protocol (SIP) registrar;
    receiving a response from the SIP registrar regarding a restored endpoint if at least one of a plurality of endpoint fails;
    querying the restored endpoint to continue the communication session.

10. The method of claim 7, further comprising:
    restoring the dialog if the persistent storage contains the corresponding dialog to the new request; and
    generating an error response if the persistent storage does not contain corresponding dialog to the new request received.

11. A computer readable storage medium including logic for storing and restoring a communication session, the logic operable to:

facilitate establishment of a communication session with a primary server by facilitating an exchange of dialog;

facilitate storage of the dialog from the communication session to a persistent storage;

facilitate monitoring of the communication session by a monitoring module;

serialize one or more selected fields of the dialog in the persistent storage, wherein an application programming interface selectively chooses the field to serialize in the persistent storage;

determine whether a failure occurs during the communication session and determine whether the failure is of the primary server;

if the failure occurs during the communication session:
 determine whether a new request is received and if the new request is received, delay restoration of the dialog from the persistent storage and search for corresponding dialog to the new request;
 receive the corresponding dialog from the persistent storage; and
 restore the corresponding dialog onto a protocol stack to continue the communication session without loss of dialog and without interrupting the dialog of the communication session for the at least one failed endpoint participating in the communication session and without communicating a notification to the plurality of endpoints when the failure occurs, wherein the corresponding dialog is restored to a secondary server if the failure is of the primary server.

12. The computer readable medium of claim 11, wherein the logic is operable to:
 associate with new dialog the persistent storage does not store.

13. The computer readable medium of claim 12, wherein the logic is operable to:
 receive dialog from the persistent storage that corresponds to a new request, wherein the persistent storage delays the restoration of dialog to search for the corresponding dialog to the new request.

14. The computer readable medium of claim 13, wherein the logic is operable to:
 restore the dialog if the persistent storage contains the corresponding dialog to the new request; and
 generate an error response if the persistent storage does not contain corresponding dialog to the new request received.

15. A system for storing and restoring a communication dialog, comprising:
 means for facilitating establishment of a communication session with a primary server by facilitating an exchange of dialog;
 means for facilitating storage of the dialog from the communication session to a persistent storage;
 means for facilitating monitoring of the communication session by a monitoring module;
 means for serializing one or more selected fields of the dialog in the persistent storage, wherein an application programming interface selectively chooses the field to serialize in the persistent storage;
 means for determining whether a failure occurs during the communication session and whether the failure is of the primary server;
 if the failure occurs during the communication session:
  means for determining whether a new request is received and if the new request is received, means for delaying restoration of the dialog from the persistent storage and means for searching for corresponding dialog to the new request;
  means for receiving the corresponding dialog from the persistent storage; and
  means for restoring the corresponding dialog onto a protocol stack to continue the communication session without loss of dialog and without interrupting the dialog of the communication session for the at least the failed endpoint participating in the communication session and without communicating a notification to the plurality of endpoints when the failure occurs, wherein the corresponding dialog is restored to a secondary server if the failure is of the primary server.

16. The system of claim 15, further comprising:
means for associating with new dialog the persistent storage does not store.

17. The system of claim 16, further comprising:
means for receiving dialog from the persistent storage that corresponds to a new request, wherein the persistent storage delays the restoration of dialog to search for the corresponding dialog to the new request.

18. The system of claim 17, further comprising:
means for restoring the dialog if the persistent storage contains the corresponding dialog to the new request; and
means for generating an error response if the persistent storage does not contain corresponding dialog to the new request received.

19. An endpoint, comprising:
means for delaying restoration of dialog from a persistent storage, wherein one or more selected fields of the dialog has been serialized in the persistent storage and an application programming interface selectively chooses the field to serialize in the persistent storage;
means for searching for corresponding dialog to a new request the endpoint receives.

20. The endpoint of claim 19, further comprising:
means for retrieving the corresponding dialog of the new request to the endpoint.

* * * * *